May 19, 1964     H. D. ERVIN     3,134,067
TRANSIENT PROTECTION FOR POWER SUPPLY

Filed Feb. 27, 1961

INVENTOR.
HAROLD D. ERVIN
BY
Lockwood, Woodard, Smith & Wickart
Attorneys

United States Patent Office 3,134,067
Patented May 19, 1964

3,134,067
TRANSIENT PROTECTION FOR POWER SUPPLY
Harold D. Ervin, Canoga Park, Calif., assignor to The Magnavox Company, Fort Wayne, Ind., a corporation of Delaware
Filed Feb. 27, 1961, Ser. No. 92,081
2 Claims. (Cl. 321—11)

This invention is related generally to electric power supplies and more particularly to power supplies capable of delivering energy to critical electronic circuits without subjecting them to damaging transients.

In many electronic circuits, the components thereof are highly adequate for normal circuit operation but are subject to damage immediately upon energization of the circuit. The damage is usually caused by high voltage transients which occur when the power is connected. Damage can be avoided either by disposing of the transient energy or by avoiding the development of transients.

It is a general object of this invention to provide an improved power supply.

It is another object of this invention to provide a power supply adapted to protect subsequent circuitry.

It is another object of this invention to provide a power supply capable of avoiding generation of transients at its output upon application of electrical energy to its input.

This invention includes in its scope a power supply including a magnetic amplifier having two windings coupled through unidirectional means to a transformer input. A re-set winding coupled through an electric energy storage device to the output from the magnetic amplifier is also inductively coupled to the magnetic amplifier windings. A diode is connected across the re-set winding and this combination by controlling saturation in the amplifier permits control of the rate of change of potential at the magnetic amplifier output upon application of electric energy to its input.

The full nature of the invention will be understood from the accompanying drawings and the following description and the claims.

Figure 1:
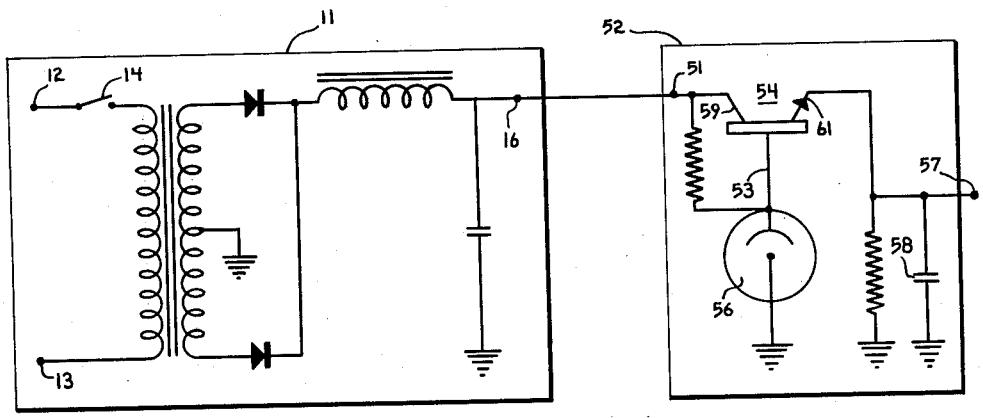
FIG. 1 shows a conventional power supply coupled to a transistor voltage regulator.

In FIG. 1, the block 11 represents a typical power supply circuit. With an alternating current voltage applied across terminals 12 and 13, the closure of switch 14 energizes the circuit and output terminal 16 rapidly rises in potential. Under these circuit conditions, the rise will rapidly reach the normal operating level.

The output voltage of the power supply at terminal 16 is connected to input terminal 51 of the simple transistor regulator 52. The base 53 of the transistor 54 is referenced to the voltage regulator tube 56 in a manner such that when output voltage from the transistor regulator at terminal 57 decreases in potential, the transistor impedance decreases thereby providing more output voltage. When the output voltage at terminal 57 increases, the transistor impedance increases thus tending to lower the output voltage. In this manner the voltage output is regulated.

Such a simple circuit as regulator 52 will perform satisfactorily except that it will not tolerate the transient voltage occurring upon the initial application of power. As switch 14 is closed, terminal 16 rises in voltage more rapidly than terminal 57. Capacitor 58 must fully charge before terminal 57 acquires normal operating potential. During this time, the voltage across the transistor from collector 59 to emitter 61 will exceed the normal transistor voltage. As transistors are voltage sensitive, this transient will likely damage or ruin the transistor.

Figure 2:
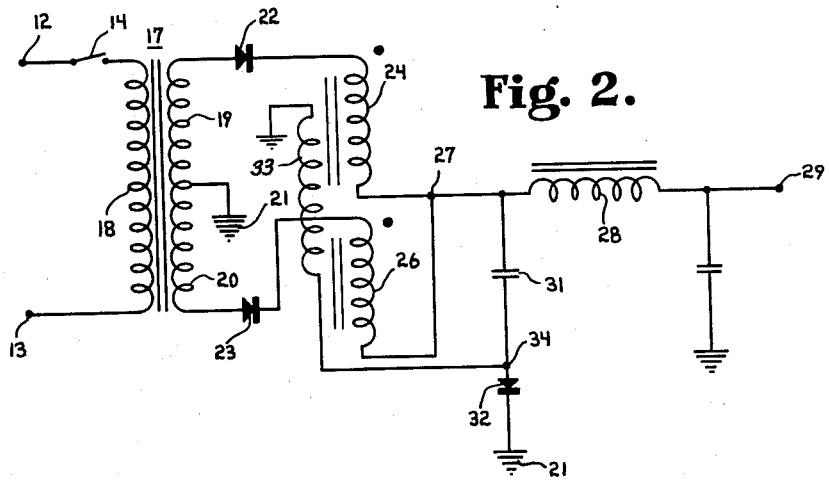
FIG. 2 shows an improved power supply exemplifying a typical embodiment of this invention.

FIG. 2 shows a power supply representing a typical embodiment of this invention. In FIG. 2 a source of alternating current electric energy would be connected across the terminals 12 and 13. Switch 14 coupled between terminal 12 and the primary winding 18 of transformer 17 permits application of the energy to the transformer. Transformer 17 has a secondary winding consisting of the portions 19 and 20 centertapped to ground 21.

The winding 19 is coupled through the unidirectional means 22 to a first gate winding 24 of a magnetic amplifier. The winding 20 of the transformer 17 is connected through the unidirectional means 23 to a second gate winding 26 of the magnetic amplifier. The two gate windings 24 and 26 are then coupled in common at junction 27 and through the inductor 28 to the output terminal 29.

A storage capacitor 31 is coupled from junction 27 and through a unidirectional means 32 to ground 21. The unidirectional means 32 is oriented to provide low forward resistance to positive current flow in the direction from the capacitor 31 to ground 21.

A re-set winding 33 of the magnetic amplifier is connected from the junction 34 between the capacitor 31 and the unidirectional means 32 to ground 21. In this magnetic amplifier two cores are employed, the winding 24 being wound on one and winding 26 being wound on the other. The re-set winding 33 is wound over both cores. Bias, feedback, and over-current windings could also be added if desired.

In the operation of the power supply of FIG. 2 with the cores of windings 24 and 26 unsaturated, the impedance of these windings is high. Capacitor 31 and the winding 33 make possible the unsaturated condition of the cores of the magnetic amplifier prior to closure of the switch 14.

Closure of switch 14 energizes the power supply and capacitor 31 begins to charge through the unidirectional means 32 to raise the potential at the output terminal 29. The high impedance due to the unsaturated condition of the cores of the magnetic amplifier delays the rise of voltage at the terminal 29 so that no damaging transient is present. Though the charging of capacitor 31 tends to produce a current in the winding 33 which is in a direction to saturate the cores, this current is negligible due to the shunting effect of the low forward resistance of the unidirectional means 32.

Each cycle of alternating current input at the terminals 12 and 13 increases the magnetic flux by an increment in the positive direction until the cores reach the condition of maximum saturation, in which condition they will then remain until the switch 14 is opened. The increaseo f flux is actually retarded due to the bucking current in the winding 33 resulting from the harmonic voltage in the winding 33 being rectified by the unidirectional means 32.

Figure 3:
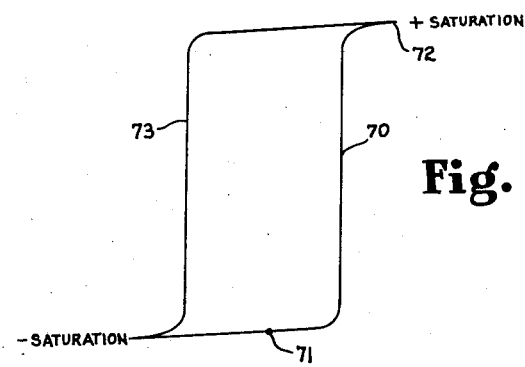
FIG. 3 shows a hysteresis loop used in the description of this invention.

The increase of flux is represented in FIG. 3 by the portion 70 of the curve between the point 71 and point 72, the point 71 representing a condition of residual negative saturation and the point 72 representing a condition of positive saturation. When switch 14 is opened, the charge on capacitor 31 is discharged through winding 33 and through the load, regulator 52 of FIG. 1, for example, connected to the output terminal 29. This is in a direction to unsaturate the cores, actually driving them to a condition of negative saturation. This action is represented in FIG. 3 by the portion 73 of the curve. The cores are now reset and remain in this condition at point 71 until the power supply is again energized.

The time delay introduced by the gradual climb up the hysteresis loop may be extended to several seconds and is sufficient to prevent damage to circuits such as for example, the transistor regulator shown in FIG. 1.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

What is claimed is:

1. A power supply comprising: an inductive coupling device having a primary winding coupled through a switch to input terminal means for connection to a source of electrical energy, a first secondary winding coupled to ground and coupled through a first unidirectional means and through a first magnetic amplifier winding to an output means and a second secondary winding coupled to ground and coupled through a second unidirectional means and through a second magnetic amplifier winding to said output means; a storage device coupled from said output means through a third unidirectional means to ground; and a third magnetic amplifier winding coupled from said storage device to ground and inductively coupled to said second and first windings to produce a slow development of potential at said output means in response to potential applied to said primary winding.

2. A power supply comprising: an inductive coupling device having a primary winding coupled through a switch to input terminal means for connection to a source of electrical energy, a first secondary winding coupled to ground and coupled through a first unidirectional means and through a first inductive device to an output means and a second secondary winding coupled to ground and coupled through a second unidirectional means and through a second inductive device to said output means; a storage device coupled from said output means through a third unidirectional means to ground; and a third inductive device coupled from said storage device to ground and inductively coupled to said second and first inductive devices to produce a slow development of potential at said output means in response to potential applied to said primary winding.

References Cited in the file of this patent
UNITED STATES PATENTS

| | | |
|---|---|---|
| 2,055,991 | Werner | Sept. 29, 1936 |
| 2,710,938 | Lee | June 14, 1955 |
| 2,816,260 | Scorgie | Dec. 10, 1957 |
| 2,977,481 | Rosa | Mar. 28, 1961 |
| 2,979,614 | Woodworth | Apr. 11, 1961 |